`3,483,109`
ELECTRODEPOSITION OF POLYCARBOXYLIC ACID RESIN AND AN ORGANOPHILIC CATION MODIFIED CLAY
Ralph M. Brane, Avon Lake, and Donald P. Hart, North Olmsted, Ohio, assignors to PPG Industries, Inc., a corporation of Pennsylvania
No Drawing. Filed Dec. 15, 1965, Ser. No. 514,111
Int. Cl. C23b *11/00;* B32b *15/08;* C08g *51/00*
U.S. Cl. 204—181    7 Claims

ABSTRACT OF THE DISCLOSURE

Aqueous electrodepositable compositions of improved properties are provided by the combination of a solubilized polycarboxylic acid resin vehicle and an organophilic cation modified clay in which the clay cation has been replaced by an onium base cation. The inclusion of such a clay overcomes the tendency of the electrodeposited coating to creep away from edges of the coated article during baking of the coating.

---

Electrodeposition is a relatively new coating technique which although based on well-known principles has only recently become technically feasible through the development of electrodepositable compositions which have the desired characteristics to meet the demands placed on a modern coating material. The coatings achieved have excellent properties for many applications and electrodeposition results in a coating which does not run or wash off during baking. Virtually any conductive substrate may be coated by electrodeposition. The most commonly employed substrates include base metals such as iron, steel, copper, zinc, brass, nickel, chromium and aluminum, as well as other metals and pretreated metals. Impregnated paper and other substances rendered conductive under these conditions may also be coated.

In the electrodeposition process, an aqueous bath containing the coating composition is placed in contact with an electrically conductive anode and an electrically conductive cathode. The surface to be coated is employed as one of the electrodes. Upon passage of an electric current between the anode and the cathode while in contact with the bath containing the coating composition, a coherent film of the coating composition is deposited on one of the electrodes. Where the electrodepositable vehicle is a polycarboxylic acid resin, the resin is coated on the anode.

Electrodeposition, in many respects, is advantageous compared to ordinary application methods. For example, electrodeposition can produce uniformly thick coatings, even over sharp corners, on edges and within lapped or boxed sections. The ability to coat within lapped or boxed sections is particularly important since there is little or no loss of protection in the enclosed areas due to solvent wash when baked, which is a problem when dipped coatings are used. It has been found, however, that while, because of the inherent characteristics of the system, edge coverage is uniform and complete, during the baking cycle of the coated article there is, in many instances, a tendency for the coating to creep away from the edges of the article, thereby causing thin or void areas which are subject to corrosion. It has now been found that the tendency of an electrodeposited coating to creep away from edges once covered to create areas susceptible to corrosion can be overcome or greatly improved by the addition of organic onium compound-treated clays and preferably amine-treated clays.

The clays which are useful in the compositions of this invention are clays capable of modification by base exchange, such as bentonite, including sodium and magnesium bentonites which contain a high percentage content of montmorillonite, as well as other clays. The clays which are useful as starting materials in accordance with this invention are those exhibiting base-exchange properties, particularly those exhibiting comparatively high base-exchange properties and containing cations capable of more or less easy replacement. The term "clay," as used in the specification and the claims, includes montmorillonite, viz., sodium, potassium, lithium, and other bentonites, magnesium bentonite, sometimes called hectorite and saponite. Other clays found in nature are nontronite, attapulgite, illite, zeolites, fuller's earth, particularly those of the Georgia-Florida type, halloysite, kaolinite, nacrite, and dickite. Clays, particularly those having high base-exchange capacities as a result of certain structural atomic replacements, are believed to have negative charges which are normally neutralized by inorganic cations. As found in nature, therefore, they exist as salts of the weak clay-acids with bases such as the alkali- or alkaline-earth metal hydroxides.

The base-exchange capacities of the various clays enumerated run from a low of about 3 to a high of about 100, based upon milliequivalents of exchangeable base per 100 grams of clay. Montmorillonite has comparatively high base-exchange capacities, viz., 60–100; kolinite and halloysite have comparatively low base-exchange capacities, viz., 3–15 and 6–15, respectively; attapulgite and illite have higher base-exchange capacities, viz., 25–35 and 15–40, respectively. The clays of higher base-exchange capacities are particularly useful where high exchange of an organic base for the cation of the clay is desired.

Generally stated, a clay, particularly one exhibiting substantial base-exchange capacity, is reacted with an organic compound, more particularly one hereinafter generally defined and referred to as an "onium" compound, by substitution of the clay cation with the cation of the organic compound, which cation is of a class hereinafter referred to as an "onium" base. The resulting compound may be used in carrying out this invention or may be further reacted with another organic compound, resulting in attachment of an organic radical to what is hereinafter generally referred to as the onium radical, in place of a hydrogen in the base. This invention is not, however, restricted to the use of a reaction product of a base-salt with a clay-salt, but includes the reaction product of a free-base with an acid-clay.

An "onium" compound has been defined in Hackh's Chemical Dictionary, second edition, as:

"A group of organic compounds of the type $RXH_y$, which are isologs of ammonium and contain the element X in its highest positive valency, viz:

"Where X is pentavalent as in ammonium phosphonium, arsonium and stibonium; where X is tetravalent as in oxonium, sulfonate, selenonium and stannonium compounds; and where X is trivalent, as in iodonium compounds; and that they may be considered additional compounds of oxonium, carbonium, stibonium, cf., -inium, -ylium."

A number of the compounds capable of reacting with clays, particularly bentonite, will be described; it is to be understood, however, that various other compounds reactable with clays, and particularly bentonite or hectorite, may be employed. These may include salts of aliphatic, cyclic, aromatic, and hetrocyclic amines, primary, secondary and tertiary amines and polyamines, also quaternary ammonium compounds, as well as other monovalent or polyvalent onium compounds, such as triphenylalkyl phosphonium-arsonium-stibonium-halides, dialkyl-, or aryl-sulphonium and seleconium halides and pyrones, such as 2,5-dimethyl gamma pyrone hydrochloride.

Additional compounds include octodecadienyl ammonium, docecyl ammonium, triphenyl lauryl phosphonium, dimethyldicetyl ammonuim, didodecyl ethyl sulfonium, decyltriphenyl arsonium, decylthripheyl stibonium, didoecylgamma pyrone, didodecyl ethyl teluronium dimethyldiotadecyl ammonium, decyl ammonium, propyl ammonium, butyl ammonium, trimethyloctyl ammonium, and undecyl ammonium compounds.

Untreated sodium bentonite in contact with water absorbs large quantities of the water and swells, forming a gel. This swelling has been attributed to the lamellar structure of the clay mineral and to absorption of water molecules onto surfaces of the mineral sheets, thus giving rise to a separation of the sheets as the oriented water layers build up to an appreciable depth. If the surfaces of the clay laminae contain organic matter, as by the process of base-exchange with an organic base, the ability of water molecules to be absorbed is elminated, and the clay no longer exhibits its formed swelling capacity in water. Thus Wyoming bentonite, for example, which is essentially the sodium salt of montmorillionitic acid, is capable of reacting with organic bases or their salts, e.g.:

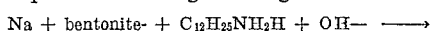
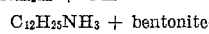

or, more readily:

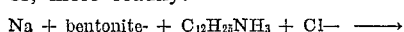
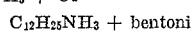

The resulting dodecylammonium bentonite is visualized as consisting of clay mineral laminae with dodecylammonium groups fairly regularly distributed over the surfaces and attached by means of the substituted ammonium groups, with the hydrocarbon tails extending out over the crystal surfaces. Such a material is now organophilic rather than hydrophilic and, as such, exhibits in organic liquids some of the charactertistics which the untreated clay exhibited in water; for example, the dilute systems which are more or less liquid have viscosity much higher than those of the liquids themselves, and in most cases exhibit thixotropy characteristic of the analogous bentonite-water system.

The situation is analogous to the above if the element X of the onium compound is other than nitrogen. The onimum compound should, however, be such that, for example, a resultant onium-bentonite will have swelling properties in organic liquids. This may be determined by introducing 2 grams of the onium-bentonite product in 100 milliliters of nitrobenzene and noting the amount of swelling in milliliters. Thus, in the case of amine-bentonite products, the employment of salts of aliphatic amines, including the octylamine, will not produce an amine-bentonite product showing a swelling of over 7.2 milliliters; however, the dodecylamine bentonite product will show a swelling of from 27 milliliters to 65 milliliters. There is generally a distinct region of increase of swelling with amine-bentonites in which the amine has in excess of 10 carbon atoms in the carbon chain, such swelling being generally in excess of 25 milliliters. These products may well be called "high-swelling" onium-bentonites. The reaction products of amine containing 3 to 8 carbon atoms, such as propyl, butyl and actyl amine are lower swelling and, thus, are used when only a low degree of swelling is necessary.

Preferably the cation-modified clays are of the low-swelling type since these impart some degree of creepage resistance without producing so great a gel state that the baked film is rough and uneven due to the fact that there is insufficient flow to allow film leveling. Preferably, the onium compound contains a total of 10 to 12 carbon atoms and, most preferably, is modified with an ammonium compound containing 11 carbon atoms, such as trimethyloctyl ammonium chloride or acetate. Compounds containing larger organic radicals can be employed, for example, up to about a total of 40 carbon atoms, although apparently rougher films are obtained.

The ratio of the onium compound, such as, for example, an amine compound to bentonite, may be varied within certain limits in converting the bentonite to the organophilic condition. In general, it is satisfactory to react the amine salt with the bentonite in the ratio of 100 milliequivalents to 100 grams of bentonite, which is approximately the base-exchange capacity of the standard highly swelling bentonites. Typical values of swelling on the above basis are listed below for a series of dodcyl-ammonium-bentonites, in which the ratio of amine-to-bentonites was varied over wide limits:

| Amine/bentonite (me./100 g.) | 50 | 75 | 100 | 125 | 150 | 200 | 300 |
|---|---|---|---|---|---|---|---|
| Swelling in nitrobenzene (ml.) | 27.3 | 43.0 | 65.3 | 47.5 | 30.0 | 20.5 | 15.5 |

This table indicates the wide range over which the amine-bentonite ratio can be varied, but it also shows the optimum effect exhibited at the theoretical base-exchange value for this combination.

The cation-modified clays employed in the compositions of this invention are of the type described in U.S. Patents 2,531,440; 2,531,427; and 2,622,987, as well as in the Official Digest, July, 1949, pages 451 to 462.

A number of electrodepositable resins are known and can be employed to provide the electrodepositable composition of this invention. Virtually any water-soluble, water-dispersible or water-emulsifiable polycarboxylic resinous material can be electrodeposited and, if film-forming, provides a coating which may be suitable for certain purposes. Any such electrodepositable polycarboxylic acid resinous material is included among those which can be employed in the present invention, even though the coating obtained may not be entirely satisfactory for certain specialized uses.

The preferred resins which may be employed in the process invention comprise a reaction product or adduct of the drying oil or semidrying oil fatty acid ester with a dicarboxylic acid or anhydride. By drying oil or semidrying oil fatty acid esters are meant esters of fatty acids which are or can be derived from drying oils or semidrying oils, or from such sources as taill oil. Such fatty acids are characterized by containing at least a portion of polyunsaturated fatty acids. Preferably, the drying oil or semidrying oil per se is employed. Generally, drying oils are those oils which have an iodine value of above about 130, and the semidrying oils are those which have an iodine value of about 90 to 130, as determined by method ASTM D1467–57T. Examples of such esters include linseed oil, soya oil, safflower oil, perilla oil, tung oil, oiticica oil, poppyseed oil, sunflower oil, tall oil esters, walnut oil, dehydrated castor oil, herring oil, menhadon oil, sardine oil, and the like.

Also included among such esters are those in which the esters themselves are modified with other acids, including saturated, unsaturated or aromatic acids such as butyric acid, stearic acid, linoleic acid, phthalic acid, isophthalic acid, terphthalic acid or benzoic acid, or an anhydride of such an acid. One inexpensive acid material which has been found to produce good results in many instances is rosin, which is composed of chiefly abietic acid and other resin acids. The acid-modified esters are made by transesterification of the ester, as by forming a di- or mono-glyceride by alcoholysis, followed by esterification with the acid; they may also be obtained by reacting oil acids with a polyol and reacting the acid with the partial ester. In addition to glycerol, alcoholysis can be carried out using other polyols such as trimethylolpropane, pentaerythritol, sorbitol, and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" and "semidrying oil fatty acid esters" as set forth herein are alkyd resins prepared utilizing semidrying or drying oils; esters of epoxides with such fatty acids, including esters of diglycidyl ethers of polyhydric compounds as well as other mono-, di- and polyepoxides; semidrying or drying oil fatty acid esters of polyols, such as butanediol, trimethylolethane, trimethylolpropane, trimethylolhexane, pentaerythritol, and the like; and semidrying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with nonoil modified alkyd resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of any of the above acids or anhydrides may also be utilized. Generally speaking, the anhydride or acid employed contains from 4 to 12 carbon atoms, although longer chain compounds can be used if so desired.

While the exact nature of the reaction product of the acid or anhydride with the fatty acid ester is not known with certainty, it is believed that the reaction takes place by addition of the unsaturated linkage of the acid or anhydride to the carbon chain of the oil. In the case of nonconjugated double bonds, such as are present in linseed oil, the reaction may take place with the methylene group adjacent the nonconjugated double bond. In the case of oils having conjugated double bonds, such as tung oil, the reaction is probably of the Diels-Alder type.

The reaction between the acid or acid anhydride and the drying oil or semidrying oil fatty acid ester takes place readily without the use of a catalyst at temperatures in the range of about 100° C. to about 300° C. or higher, with the reaction generally being carried out between about 200° C. and about 250° C.

While the reaction products can be comprised solely of addicts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics. For this purpose, any ethylenically unsaturated monomer can be employed. Examples of such monomers include monoolefinic and diolefinic hydrocarbons such as styrene, alpho-methyl styrene, alpha-butyl styrene, vinyl toluene, butadiene-1,3, isoprene, and the like; halogenated monoolefinic and diolefinic hydrocarbons, such as alpha-chlorostyrene, alpha-bromostyrene, chlorobutadiene and similar compounds; esters of organic and inorganic acids, such as vinyl acetate, vinyl propionate, vinyl-2-chlorobenzoate, methyl acrylate, ethyl methacrylate, butyl methacrylate, haptyl acrylate, decyl methacrylate, methyl crotonate, isopropenyl acetate, vinyl alpha-bromopropionate, vinyl alpha-chlorovalerate, allyl chloride, allyl cyanide, allyl bromide, allyl acetate, dimethyl itaconate, dibutyl itaconate, ethyl alpha-chloroacrylate, isopropyl alpha-bromoacrylate, decyl alpha-chloroacrylate, dimethyl maleate, diethyl maleate, dimethyl fumarate, diethyl fumarate, and diethyl gultaconate; organic nitriles, such as acrylonitrile, methacrylonitrile, and ethacrylonitrile; and the like.

As is apparent from the above discussion and the examples set forth, which, of course, do not include all of the ethylenically unsaturated monomers which may be employed, any such monomer can be utilized. The preferred class of monomers can be described by the formula:

(I)
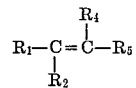

where $R_1$ and $R_2$ are hydrogen or alkyl, $R_4$ is hydrogen, alkyl or carboxyalkyl and $R_5$ is cyano, aryl, alkyl, alkenyl, aralkyl, alkaryl, alkoxycarbonyl or aryloxycarbonyl. The preferred compounds are styrene, substituted styrenes, alkyl acrylates, alkyl methacrylates, diolefins and acrylonitriles.

The reaction of the fatty acid ester, the acid or anhydride and any additional monomer or monomers can be carried out concurrently, that is, with each of the components of the reaction product being mixed together and heated to reaction temperature. However, because the monomer and the acid or anhydride are often quite reactive with each other, the oil or other fatty acid ester is preferably first reacted with the acid or acid anhydride, and then this product is subsequently reacted with any ethylenically unsaturated monomer or monomers employed. For example, a reaction product of linseed oil, maleic anhydride and styrene is made by first reacting maleic anhydride with linseed oil and then reacting the maleinized oil with styrene. When the process is carried out in this manner, the reaction of the additional monomer with the initial reaction product is usually carried out at somewhat lower temperatures, usually between about 25° C. and 200° C.

The proportions of each of the components going to make up the reaction product are ordinarily not critical. Generally speaking, between about 10 percent and about 45 percent by weight of the unsaturated acid or acid anhydride is reacted with from about 55 percent to about 90 percent by weight of fatty acid ester. In the presently prefered products, usually 15 percent to 30 percent of anhydride and 70 percent of 85 percent of oil ester are employed. If an ethylenically unsaturated monomer is incorporated in the reaction product, it is typically used in amounts between about 5 percent and about 35 percent by weight, based upon the total weight of acid or anhydride and ester, with between 10 percent and 25 percent being used in those products preferred at present. Thus, in most instances, the total composition of the reaction product may comprise from about 35 percent to about 90 percent by weight of the fatty acid ester and from about 10 percent to about 65 percent of the acid or anhydride and other monomer combined, with between about 6 percent and about 45 percent of the acid or anhydride always present.

The products produced in the above manner are comprised of polymeric chains of moderate length. The average molecular weight of the products to be used in electrodeposition should be low enough so that its flow characteristics at high solids are maintained, but high enough to provide adequate throwing power. The desirable molecular weight levels vary with the coating composition and conditions employed. Generally those products having molecular weights of up to 10,000 or somewhat higher have given the best results.

Neutralization of these products is acomplished by reaction of all or part of the dicarboxylic anhydride groups with a base. Usually up to about half of such groups are neutralized in unesterified adducts; the partially esterified products are often neutralized to a greater extent, based on unesterified acid groups remaining.

It is preferred in certain instances that the neutralization reaction be carried out in such a manner that amido groups are attached to part of the carbonyl carbon atoms derived from the dicarboxylic acid or anhydride. By amido groups are meant trivalent nitrogen atoms attached with one valence to the carbonyl carbon atom with the other two valences being linked to hydrogen or carbon atoms in the same or different organic radicals. Amido groups are formed, for example, when the reaction with the neutralizing base is carried out with a water solution of amonia, a primary amine or a secondary amine, or when the product is reacted with an amine in the absence of water.

Compositions within this general class are described in copending applications Ser. No. 222,674, filed Sept. 10, 1962, now U.S. Patent 3,366,563, and Ser. No. 282,880, filed May 24, 1963, now U.S. Patent 3,369,983.

Another vehicle comprises the fatty acid ester, unsaturated acid or anhydride reaction products and any additional unsaturated modifying materials (as described above) which are further reacted with the polyol.

Essentially any polyol can be employed but diols are preferred. When higher polyols, such as trimethylolpropane, glycerol, pentaerythritol and the like are utilized, they are employed in small amounts, or in conjunction with the diol, or in the presence of a monohydric alcohol, and are used with adducts having a relatively low proportion of acidic component. The various diols that can be employed include, for example, ethylene glycol, 1,2-propylene glycol, 1,4-butanediol, 1,5-pentanediol, 2-methyl-2-n-propyl - 1,3 - propanediol, and similar higher or substituted alkylene glycols, containing up to about 20 carbon atoms or more. Glycol ethers may also be employed, such as diethylene glycol, triethylene glycol, poly(oxytetramethylene) glycols and the like, those having molecular weights of up to about 400 being most useful. Water-insoluble diols are often preferable, and especially desirable water-dispersed compositions for electrodeposition are obtained using 2,2-bis(4-hydroxycyclohexyl)propane (which has given the best results), neopentyl glycol, 1,1'-isopropylidenebis(p-phenyleneoxy)di - 2 - propanol, and similar diols.

The proportions of polyol and ester-anhydride adduct that are employed depend upon various factors, but are in general limited only by the need to avoid gelation of the product. The total functionality of the reactants is a guide to determining the optimum proportions to be employed, and in most instances should not be greater than about 2. By total functionality is meant the total number of anhydride and hydroxyl groups divided by the total number of molecules of polyol and adduct. The numbers involved are, of course, average figures, and obviously many factors are taken into consideration in determining functionality, these being well known in the art. When monomeric constituents are used, their functionality is relatively easily determined; but with resinous products such as the adducts herein, not only the proportion of anhydride in the adduct but also the bodying effect due to heating and similar considerations should be taken into account. In any event, one can easily determine whether any particular combination of reactants results in a gelled product, and as mentioned above, gelation can often be reversed by adding a monohydric alcohol.

In most instances, the reaction products herein are made from about 65 percent to about 98 percent of esteranhydride adduct and about 2 percent to about 35 percent of a diol, these percentages being by weight. However, it will be understood that depending upon the molecular weights of the reactants, varying amounts within these ranges or outside these ranges are employed with particular reaction systems.

In many instances, only part of the anhydride groups of the adduct, e.g., about 10 percent, are reacted with the polyol. Of those anhydride groups reacted, it is preferred that only one of the carboxyl groups is esterified in each instance. This is relatively easily accomplished because the half-ester of the dicarboxylic acid anhydride moieties present is preferentially obtained before the full ester begins to be formed. In addition, production of the full ester generally requires more stringent conditions, such as higher temperatures, even when an excess of hydroxyl groups are present. Thus, while it is not necessary that each anhydride form the half-ester and some of the dicarboxylic groups may be fully esterified, in actual practice the half-esters of the dicarboxylic acid moieties are usually obtained.

The reaction with the polyol is ordinarily carried out by admixing the initial reaction product of the fatty ester, the acid or anhydride, and any additional monomer with the polyol. The reaction at room temperature is quite slow, and thus it is preferred to heat the reaction mixture moderately, i.e., to about 80° C. or higher. The preferred maximum temperature is that at which the full ester begins to be formed, which varies with the particular polyol and which is in most cases about 180° C., but higher temperatures, up to about 300° C., can be used if desired, for example, when the number of hydroxyl groups present does not exceed the number of anhydride groups present.

When the reaction is carried out as described, the product contains a substantial part of the original acidity derived from the dicarboxylic acid or anhydride; ordinarily the product should have an acid number of at least about 20. To provide a water-dispersed product, such as is used in electrodeposition processes, at least part of the remaining acidic groups are neutralized by reaction of the partially esterified product with a base.

The polyol reaction products are more fully described in application Ser. No. 450,205, filed Apr. 22, 1965.

Another type of electrodepositable coating composition which gives desirable results are the water-dispersible coating compositions comprising at least partially neutralized interpolymers of hydroxyalkyl esters of unsaturated carboxylic acids, unsaturated carboxylic acids and at least one other ethylenically unsaturated monomer. These are employed in the composition along with an amine-aldehyde condensation product with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids, such as ethacrylic acid, crotonic acid, maleic acid, or other acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diesters of the dicarboxylic acids mentioned are included. Ordinarily, the acid and ester each comprise between about 1 percent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylates; and the vinyl aromatic hydrocarbons, such as styrene; but others can be utilized.

The above interpolymer is at least partially neutralized by reaction with a base as described above; at least about 10 percent, and preferably 50 percent or more of the acidic groups are neutralized, and this can be carried out either before or after the incorporation of the interpolymer in the coating composition. The bases above can be used, with ammonia and amines being preferred; except when a polyepoxide is present, in which case there is preferably a hydroxide, such as sodium hydroxide, or if an amine, a tertiary amine.

The amine-aldehyde condensation products included in these compositions are, for example, condensation products of melamine, benzoguanamine, or urea with formaldehyde, although other amine-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol, and the products utilized can be water-soluble or organic solvent-soluble.

Electrodepositable compositions comprising the above interpolymers and an amine-aldehyde resin are more fully described in copending application Ser. No. 368,394, filed May 18, 1964, now U.S. Patent 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface active agent, such as a polyalkylene glycol (e.g., "Carbowax") is incorporated. High acid number alkyds are also made employing a tricarboxylic acid, such as trimellitic acid or anhydride, along with a polyol in making the alkyd.

The above aykyds are combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl)melamine.

The alkyd-amine compositions are dispersed in water and they ordinarily contain from about 10 percent to about 50 percent by weight of amine resin based on the total resinous components.

Examples of compositions of this class are described in U.S. Patents Nos. 2,852,475; 2,852,476; and 2,853,459.

The neutralization and solubilization of the above vehicles is accomplished by the use of a base. Inorganic bases such as metal hydroxides or, more desirably, ammonia can be used for this purpose, as can organic bases, particularly amines. Among the preferred class of neutralizing bases are ammonia and any basic amine. Examples of such amine are primary and secondary amines, including alkyl amines, such as methylamine, ethylamine, propylamine, butylamine, amylamine, dimethylamine, diethylamine, dipropylamine, dibutylamine, and N-methylbutylamine; cycloalkyl amines, such as cyclohexylamine; unsaturated amines, such as allylamine, 1,2-dimethylpentenylamine and pyrrole; aryl amines, such as aniline; aralkyl amines such as benzylamine and phenethylamine; alkaryl amines, such as m-toluidine, cyclic amines, such as morpholine, pyrrolidine and piperidine; diamines, such as hydrazine, methylhydrazine, 2,3-toluenediamine, ethylenediamine, 1,2-naphthalenediamine and piperazine; and substituted amines, such as histamine, hydroxylamine, ethanolamine, and diethanolamine; as well as tertiary amines such as trimethylamine, triethylamine, dimethylethanolamine, N-methyl morpholine, triethanolamine and the like.

It has been found advantageous in many instances to effect part of the neutralization with certain solid amines, notably amino-alkyl-alkanediols, such as, for example, 2-methyl-2-amino-1,3-propanediol, 2 - ethyl-2-amino-1,3-propanediol, or 2-methyl-2-amino-1,4-butanediol. The films produced when a small amount of such amines are employed are considerably harder and often have improved water-resistance. However, preferably not more than about 4 percent by weight of the resinous components of these solid amines are utilized, since they are relatively expensive and greater amounts do not further improve the film's properties and may even slightly decrease its water-resistance.

The electrodepositable coating compositions of the instant invention may contain a pigment composition. The pigment composition may be of any conventional type, comprising, for example, iron oxides, lead oxides, lead silico chromate, carbon black, titanium dioxide, talc, barium sulfate, strontium chromate, and the like, as well as combinations of these and similar pigments. Color pigments such as cadmium yellow, cadmium red, phthalocyanine blue, chromic yellow, toluidine red, hydrated iron oxide and the like may be included, if desired. Better results with pigmented compositions are attained if the weight ratio of pigment solids to vehicle solids is not higher than about 1.5 to 1, and preferably not higher than about 1 to 1.

There may also be included in the coating composition, if desired, additives such as antioxidants, for example, orthoamyl phenol or cresol (the commercial mixture of isomeric cresols is satisfactory). It is found especially advantageous to include such antioxidants in coating compositions which are used in baths which may be exposed to atmospheric oxygen at elevated temperatures and with violent agitation over extended periods of time.

In formulating the coating composition, ordinary tap water may be employed. However, such water may contain a relatively high level of metals and cations; while not rendering the process inoperative, the use of water containing these cations may result in variations in the properties of the bath when used for electrodeposition. Thus, it is often desirable to utilize deionized water, i.e., water from which free ions have been removed as by passage through an ion exchange resin, in making up the coating compositions of the invention.

Other additives which may be included in the coating composition, if desired, include, for example, wetting agents such as petroleum sulfonates, sulfated fatty amides, esters of sodium isothionates, or alkylphenoxypolyoxyethylene alkanols, as well as driers such as the linoleates, the naphthenates, the octanates and the tallates of such metals as lead, cobalt, manganese, iron, copper and zirconium. Other additives which may be employed include antifoaming agents, suspending agents bactericides, and the like.

In electrodeposition processes employing the various coating compositions described above, an aqueous bath containing the coating composition is placed in contact with an electrically conductive anode and an electrically conductive cathode. The surface to be coated is employed as one of the electrodes. In the specific examples of compositions described above, the surface to be coated is employed as the anode. Upon the passage of electric current between the anode and the cathode, while in contact with the bath containing the coating composition, an adherent film of the coating composition is deposited. The conditions under which the electrodeposition step herein is carried out are those conventionally used in electrodeposition of coatings. The applied voltage may be varied greatly and can be, for example, as low as 1 volt or as high as several thousand volts, although typically between 50 volts and 500 volts. The current density is usually between about 0.1 ampere and 15 amperes per square foot, and is high initially and tends to decrease during the electrodeposition of a single article.

The concentration of the nonvolatile components (i.e., vehicle and any pigments and the like) in the aqueous bath is not critical and relatively high levels can be employed. However, it is ordinarily desirable to use as low a concentration as gives satisfactory results, and in the cases of the above-described compositions, aqueous compositions containing as little as 1 percent by weight of nonvolatile solids can be employed, while those containing between 5 percent and 20 percent by weight are preferred.

The cation-modified clays may be incorporated into the composition in much the same manner as a pigment. The clay may be dispersed along with the pigments which are incorporated into the system. This dispersing is usually accomplished by conventional methods known to the art, such as a ball mill, pebble mill, sand mill or an attritor. The grinding is usually accomplished in the presence of a portion of the vehicle employed in the composition.

The pigment-binder ratio in the grinding step is not critical, however between about 3.5 to 1 and 7 to 1 are frequently employed, although other levels may be utilized. Alternatively, grinding may be accomplished in a vehicle-free grind employing dispersing agents or surfactants such as phosphorized ethoxylated aliphatic alcohols or alkyl phenols, and particularly nonylphenol(polyethoxy)phosphate esters.

If no pigments are employed, or if it is desired to incorporate the clays separately, the clay may be dispersed by grinding as if it were a pigment and incorporating into the composition in a conventional manner.

The amount of cation-modified clays which may be incorporated into an electrodeposition composition in order to improve edge coverage varies depending on the vehicle and the clay employed. Preferably about 0.4 to about 1.5 percent by weight of the total solids is employed, however amounts as low as 0.1 percent to about 4.0 percent may be employed.

The invention is further described in conjunction with the following examples which are considered illustrative rather than limiting. All parts are percentages in the examples and throughout the specification are by weight unless otherwise stated.

EXAMPLE I

A thermal interpolymer was prepared by heating a mixture of 1341 parts of linseed oil and 722 parts of an unsaponifiable unsaturated hydrocarbon resin possessing an iodine value of about 180, a softening point of about 100° C., molecular weight between about 250 and 900, derived from the polymerization of cyclic and straight and branched-chain olefins obtained from petroleum cracking (this resin is known as Picadiene 9215). Other hydrocarbon resins that can be used in the same manner include those known as Panarez resins, these being produced by the polymerization of olefins and diolefins and having a softening point of 222° F., and the similar hydrocarbon resins known as XL resins.

The mixture was heated at 285° C. for 1 hour, during which time a stream of inert gas was passed through the reaction mass to remove volatile constituents. The product was cooled and 190 parts of maleic anhydride were added and this mixture was heated to 260° C. for 1 hour. 97.2 parts of 2,2-bis(4-hydroxycyclohexyl)propane were then added and the reaction mass was cooled. To the reaction mass was added 280 parts of pentoxone.

The final product was approximately 90 percent solids, had a Brookfield viscosity of 83,000 centipoises, and an acid value of approximately 38.

The above composition was designated Resin A.

Resin A was solubilized as follows:

To a mixture of 13.9 parts of diethylamine and 348 parts of deionized water was added the following premixture slowly with agitation:

| | Parts by wt. |
|---|---|
| Resin A (above) | 321.0 |
| Pentoxone | 42.5 |
| Cresylic acid | 3.2 |
| Deionized water | 101.0 |

The above aqueous mixture was approximately 35 percent solid and had a pH of approximately 9.1. This mixture was designated as Resin AS.

A second vehicle resin was prepared by heating a 4 to 1 weight mixture of linseed oil and maleic anhydride to 250° C. over a 2-hour period to obtain a resin having a measured acid value of 104 in alcoholic KOH, and a Brookfield viscosity of 32,500 centipoises. This resin was designated Resin B.

Resin B was solubilized as follows:

304.1 parts Resin B and 30.5 parts of diethylamine were mixed well. There was then added 3 parts of cresylic acid and 304 parts of deionized water. To the above mix was then added an additional 188.9 parts of deionized water. The above composition was approximately 40 percent solids and had a pH of approximately 7. This resin was designated as Resin BS.

A paste was formed by adding and mixing in the following order:

| | Parts by wt. |
|---|---|
| Resin BS (above) | 15.31 |
| Resin AS (above) | 16.71 |
| Dispersing agent (combination oil-soluble sulfonate nonionic surfactant—Witco 912) | 0.57 |
| Deionized water | 9.56 |
| Diethylamine | 0.39 |

The mixture was mixed well and the pH adjusted to approximately 10.2. There was then added 2.88 parts of strontium chromate and 54.52 parts of red iron oxide. The above mixture was ground to a pigment reading of 7 in a sand mill. This was designated Paste C.

An electrodeposition primer was formed by mixing the following:

| | Parts by wt. |
|---|---|
| Resin AS (above) | 737.54 |
| Pigment paste C (above) | 140.88 |

The above was slowly reduced with deionized water to 8.75 percent solids, at a pH of approximately 9.1. This was designated Primer D.

Another electrodeposition vehicle was prepared as follows:

A reactor was charged with 482 parts of 2,2-bis(4-hydroxycyclohexyl)propane, 374 parts soybean fatty acids, and 209 parts of 1,5-pentandiol. Inert gas was sparged through the mixture, which was heated to 260° F. with stirring, at which time 372 parts of trimellitic anhydride was added and the mixture heated to 350°–355° F. until an acid number of about 52 was obtained. The mixture was cooled and a condenser turned on and set for total reflux. At 250° C., 446 parts of 4-methoxy-4-methylpentanone-2 were added. At 170° F., 8 parts of propylene imine were added and at 130° F. 449 parts of hexakis-(methoxymethyl)melamine (preheated to a liquid state) were added and the mixture heated to 150° F. and held for 1 hour. The mixture was then cooled to 120° F. and 90 parts of triethylamine were added. After ½ hour, 2200 parts of deionized water was added. The pH was adjusted to 7.9 with triethylamine. This composition was designated Resin ES.

A clay-containing paste was made by charging the following into a pebble mill in the following proportions: 15 weight ounces of a montomorillonite clay (hydrous magnesium aluminum silicate), modified with the trimethyl octyl ammonium ion and containing 0.65 percent nitrogen; 20 fluid ounces of Resin ES, 53 fluid ounces of deionized water, 1.25 fluid ounces of dispersing agent (combination oil-soluble sulfonate nonionic surfactant—Witco 912), 18 cubic centimeters of triethylamine. This was milled until dispersed and then washed out with 9 fluid ounces of deionized water. This was designated Clay Paste F.

Metal panels in which holes had been punched, leaving burred edges, were coated under identical conditions with Primer D and with Primer D to which sufficient Paste F was added to incorporate 1 percent modified clay. After 3 days of salt spray exposure, the Primer D-coated panels showed significant failure at the burred edges, blistering at least an inch from the edges; while the Primer D with modified clay added panels showed only slight failure.

EXAMPLE II

A similar series of panels was prepared using a primer based on a 20 percent maleinized linseed oil vehicle and containing strontium chromate and carbon black pigments.

The modified clay used in Example I was added to the primer at 1 percent, 2 percent, and 4 percent levels.

Panels were coated and baked and exposed to salt spray. The compositions containing the cation-modified clay showed superior salt spray resistance to be better edge coverage.

According to the provisions of the patent statutes, there are described above the invention and what are now considered to be its best embodiments; however, within the scope of the appended claims, it is to be understood that the invention can be practiced otherwise than specifically described.

We claim:

1. A method of coating a conductive substrate which comprises passing electric current between an electrically conductive cathode and said substrate serving as an anode in contact with an aqueous bath comprising a solubilized polycarboxylic acid resin vehicle and an organophilic cation-modified clay, originally exhibiting a substantial base change capacity, in which the clay cation has been replaced by a substituted cation of the class of onium bases consisting of ammonium, phosphonium, sulfonium, arsonium, stibonium, oxonium and telluronium bases.

2. A method as in claim 1 wherein the base is an ammonium base.

3. A method as in claim 2 wherein the ammonium base contains 10 to 12 carbon atoms.

4. A method as in claim 3 where the base is a trimethyl actyl ammonium base.

5. A method as in claim 2 wherein the resin vehicle comprises a solubilized reaction product of a drying oil fatty acid ester with a member of the group consisting of alpha, beta-ethylenically unsaturated dicarboxylic acids and an anhydride of said acids.

6. A method as in claim 2 wherein the resin vehicle comprises a solubilized alkyd resin.

7. An article coated by the method of claim 1.

References Cited

UNITED STATES PATENTS

| | | | |
|---|---|---|---|
| 2,327,462 | 8/1943 | Ruben | 204—181 |
| 2,421,652 | 6/1947 | Robinson et al. | 204—181 |
| 2,495,630 | 1/1950 | Dorst | 204—181 |
| 2,531,427 | 11/1950 | Hauser | 260—448 |
| 2,531,440 | 11/1950 | Jordan | 252—28 |
| 2,622,987 | 12/1952 | Ratcliffe | 106—20 |
| 2,739,085 | 3/1956 | McBride | 204—181 |
| 3,230,162 | 1/1966 | Gilchrist | 204—181 |
| 3,366,563 | 1/1968 | Hart et al. | 204—181 |
| 3,369,983 | 2/1968 | Hart et al. | 204—181 |
| 3,403,088 | 9/1968 | Hart | 204—181 |

E. ZAGARELLA, Jr., Primary Examiner

JOHN H. MACK, Assistant Examiner

U.S. Cl. X.R.

204—181